(12) United States Patent
Chen et al.

(10) Patent No.: US 11,890,794 B2
(45) Date of Patent: Feb. 6, 2024

(54) MANUFACTURING METHOD AND MOLD FOR ARTIFICIAL SHUTTLECOCK

(71) Applicant: Victor Rackets Industrial Corp., Taipei (TW)

(72) Inventors: Shu-Jung Chen, Taipei (TW); Chao-Ming Chen, Taipei (TW); Tzu-Wei Wang, Taipei (TW); Hsin-Chen Wang, Taipei (TW); Yi-Ling Hou, Taipei (TW)

(73) Assignee: Victor Rackets Industrial Corp., Taipei (TW)

( * ) Notice: Subject to any disclaimer, the term of this patent is extended or adjusted under 35 U.S.C. 154(b) by 0 days.

(21) Appl. No.: 17/969,881

(22) Filed: Oct. 20, 2022

(65) Prior Publication Data
US 2023/0158722 A1 May 25, 2023

(30) Foreign Application Priority Data
Nov. 25, 2021 (TW) .................................. 110144061

(51) Int. Cl.
*B29C 45/37* (2006.01)
*B29C 45/14* (2006.01)
(Continued)

(52) U.S. Cl.
CPC .. *B29C 45/14467* (2013.01); *B29C 45/14008* (2013.01); *B29C 45/263* (2013.01); *B29L 2031/52* (2013.01)

(58) Field of Classification Search
CPC ............ B29C 45/263; B29C 45/14008; B29C 45/14467; B29C 45/14934;
(Continued)

(56) References Cited

U.S. PATENT DOCUMENTS 2,025,325 A * 12/1935 Bauer .................. A63B 67/187
473/580
2,485,421 A * 10/1949 Timpe ................ B29C 33/0033
249/96

(Continued)

FOREIGN PATENT DOCUMENTS

| CN | 105771207 B | 2/2018 |
|---|---|---|
| GB | 686059 A | 1/1953 |
| KR | 20150039912 A | 4/2015 |

*Primary Examiner* — Thu Khanh T. Nguyen
(74) *Attorney, Agent, or Firm* — Best & Flanagan LLP (57) ABSTRACT

A mold for manufacturing an artificial shuttlecock from a semi-finished shuttlecock includes a male mold and a female mold. The male mold includes a cone frustum and a plurality of first annular grooves. The semi-finished shuttlecock is placed on an outside of the cone frustum. The first annular grooves are disposed apart on the outside of the cone frustum. The female mold includes a tapered slot, a plurality of second annular grooves and an injection channel. The second annular grooves are disposed apart on an inner surface of the tapered slot. When the semi-finished shuttlecock and the male mold are placed into the female mold, each of the first annular grooves corresponds to each of the second annular grooves to form a plurality of molded grooves. The injection channel communicates with the second annular grooves, and the molded grooves communicate with the injection channel through the second annular grooves.

14 Claims, 8 Drawing Sheets

(51) Int. Cl.
*B29C 45/26* (2006.01)
*B29L 31/52* (2006.01)

(58) Field of Classification Search
CPC .......... B29C 45/14967; B29C 33/0033; B29C 33/20; B29L 2031/52
See application file for complete search history.

(56) References Cited

U.S. PATENT DOCUMENTS

| | | | | |
|---|---|---|---|---|
| 2,666,643 | A * | 1/1954 | Miller | A63B 67/19 473/580 |
| 6,849,225 | B1 * | 2/2005 | Gilbert | B29C 45/14196 425/DIG. 58 |
| 10,857,447 | B2 * | 12/2020 | Rainwater | A63D 15/10 |
| 2014/0335980 | A1 * | 11/2014 | Dai | A63B 67/18 473/580 |

* cited by examiner

MANUFACTURING METHOD AND MOLD FOR ARTIFICIAL SHUTTLECOCK

BACKGROUND

1. Technical Field

The present disclosure relates to a manufacturing method and a mold for an artificial shuttlecock.

2. Description of the Related Art

Badminton games are common and popular ball games, and badminton players play the games by hitting a shuttlecock. A conventional shuttlecock is primarily in a structure of natural feather combined at a ball head. The natural feather is mostly goose feather or duck feather, and is bleached, selected and then made into shuttlecocks. However, the acquisition of natural feather has become increasingly difficult, and the selection process is complicated and labor consuming. Thus, there are artificial shuttlecocks commercially available, in the attempt of solving the issues of shortage of natural feather and complicated selection processes.

Most artificial feather is formed as soft ball skirt in substitution for natural feather, and airflow produced during hitting is born by the structure of the soft ball skirt. However, a shuttlecock made of such soft ball skirt does not provide users with satisfactory hitting sensations as shuttlecocks made of natural feather, and acceptance by users is rather limited. There are current designs of stems made of a fiber reinforced resin material, and feathers made of a light foam material. Such type of artificial shuttlecocks has a similar appearance as that of natural feather shuttlecocks, and provides hitting sensations better than those of shuttlecocks made of soft ball skirt.

However, artificial shuttlecocks having feathers made of a light foam material have more complicated manufacturing steps. For example, a plurality of feathers are respectively adhered to one end of a plurality of stems, and the other end of each of the stems is inserted at a ball head, so as to form a semi-finished shuttlecock having the ball head, the stems and the feathers. Next, linen yarn is wound around these stems to keep the distances between the stems constant. After winding of the linen yarn, the linen yarn needs to be tied and knotted manually, and glue is applied to the linen yarn. A connecting member of an artificial shuttlecock is formed once the glue is dried. In other words, there is need for an improvement for the complicated manufacturing steps of a connecting member of an artificial shuttlecock having feathers made of a foam material.

SUMMARY

In view of the task above, it is a primary object of the present disclosure to provide a manufacturing method and a mold for an artificial shuttlecock, in which connecting members of the artificial shuttlecock are made by a structure of a male mold and a female mode, so as to solve the issues of a complicated manufacturing process of a conventional artificial shuttlecock.

To achieve the object above, the present disclosure provides a manufacturing method for an artificial shuttlecock. The manufacturing method includes: providing a semi-finished shuttlecock including a ball head, a plurality of stems and a plurality of feathers, one end of each of the stems inserted at the ball head, the feathers connected to the other end of each of the sterns; placing the semi-finished shuttlecock into a male mold, the male mold including a cone frustum and a plurality of first annular grooves, the first annular grooves disposed apart on an outside of the cone frustum, the semi-finished shuttlecock placed on the outside of the cone frustum; placing the semi-finished shuttlecock and the male mold into a female mode, the female mold including a tapered slot, a plurality of second annular grooves and an injection channel, the second annular grooves disposed apart on an inner surface of the tapered slot, the injection channel communicating with the second annular grooves, each of the first annular grooves corresponding to each of the second annular grooves to form a plurality of molded grooves, the molded grooves communicating with the injection channel through the second annular grooves; and injecting a plastic material from the injection channel, the plastic material solidifying in the molded grooves to form a plurality of connecting members.

To achieve the object above, the present disclosure further provides a mold for manufacturing an artificial shuttlecock from a semi-finished shuttlecock. The semi-finished shuttlecock includes a ball head, a plurality of stems and a plurality of feathers. One end of each of the stems is inserted at the ball head, and the feathers are connected to the other end of each of the stems. The mold includes a male mold and a female mold. The male mold includes a cone frustum and a plurality of first annular grooves. The cone frustum has an outside, and the semi-finished shuttlecock is placed on the outside of the cone frustum. The first annular grooves are disposed apart on the outside of the cone frustum. The female mold includes a tapered slot, a plurality of second annular grooves and an injection channel. The tapered slot has an inner surface. The second annular grooves are disposed apart on the inner surface of the tapered slot. When the semi-finished shuttlecock and the male mold are placed into the female mold, each of the first annular grooves corresponds to each of the second annular grooves to form a plurality of molded grooves. The injection channel communicates with the second annular grooves, and the molded grooves communicate with the injection channel through the second annular grooves. A plastic material is injected from the injection channel, and the plastic material is solidified in the molded grooves to form a plurality of connecting members.

According to an embodiment of the present disclosure, the first annular grooves are parallel to a top surface of the cone frustum.

According to an embodiment of the present disclosure, the male mold includes a plurality of first stem grooves. The first stem grooves are disposed apart on the outside of the cone frustum, and intersect the first annular grooves. The stems of the semi-finished shuttlecock are accommodated in the first stem grooves.

According to an embodiment of the present disclosure, the numbers of the first annular grooves and the second annular grooves are three, respectively, so as to form three molded grooves.

According to an embodiment of the present disclosure, distances between every two adjacent of the first annular grooves are substantially equal.

According to an embodiment of the present disclosure, the tapered slot includes a ball head portion and a first cone portion, wherein the first cone portion is disposed adjacent to the ball head portion. The ball head of the semi-finished shuttlecock is accommodated in the ball head portion, and the second annular grooves are disposed at the first cone portion.

According to an embodiment of the present disclosure, the tapered slot includes a second cone portion, which is disposed adjacent to the first cone portion. An inner diameter of the second cone portion is greater than an inner diameter of the first cone portion. The feathers of the semi-finished shuttlecock are accommodated in the second cone portion.

In continuation of the description above, in the manufacturing method and the mold for an artificial shuttlecock according to the present disclosure, the mold includes a male mold and a female mold. The male mold includes a cone frustum and a plurality of first annular grooves, and the first annular grooves are disposed apart on an outside of the cone frustum. Correspondingly, the female mold includes a tapered slot and a plurality of second annular grooves, and the second annular grooves are disposed apart at the tapered slot. When the semi-finished shuttlecock and the male mold are placed into the female mold, the first annular grooves correspond to the second annular grooves to form molded grooves. Moreover, the female mold further includes an injection channel communicating with the second annular grooves. Once a plastic material is injected from the injection channel, the plastic material is solidified in the molded grooves to form a plurality of connecting members, thereby forming the artificial shuttlecock, By forming the connecting members by means of solidifying a plastic material, steps including winding, tying, knotting and gluing of wheel lines for connecting members using a linen yarn can be eliminated, further enhancing manufacturing efficiency of artificial shuttlecocks.

BRIEF DESCRIPTION OF THE DRAWINGS

FIG, 4 is a schematic diagram of a female mold according to an embodiment of the present disclosure.

FIG, 6 is a section diagram of a mold according to an embodiment of the present disclosure.

DETAILED DESCRIPTION OF THE EMBODIMENTS

In order to make the structure and characteristics as well as the effectiveness of the present disclosure to be further understood and recognized, the detailed description of the present disclosure is provided as follows along with embodiments and accompanying figures.

Figure 1:
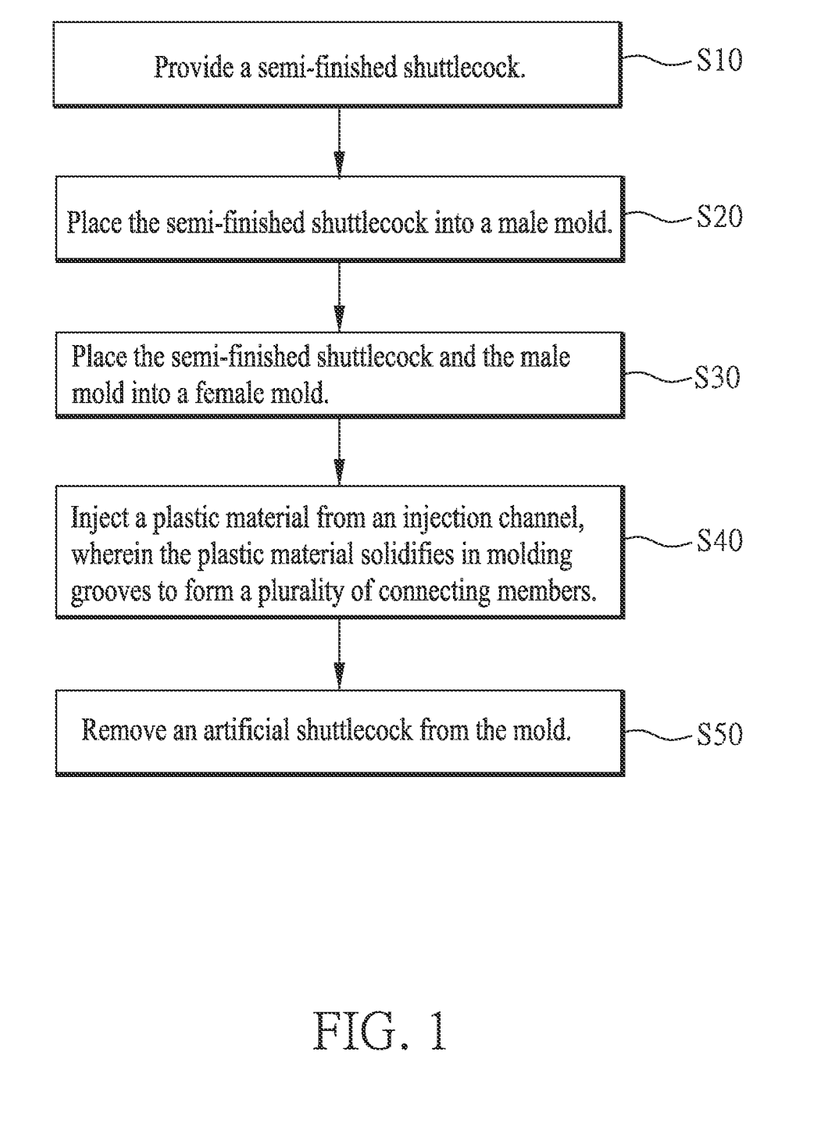
FIG. 1 is a flowchart of a manufacturing method for an artificial shuttlecock according to an embodiment of the present disclosure.
Figure 2:
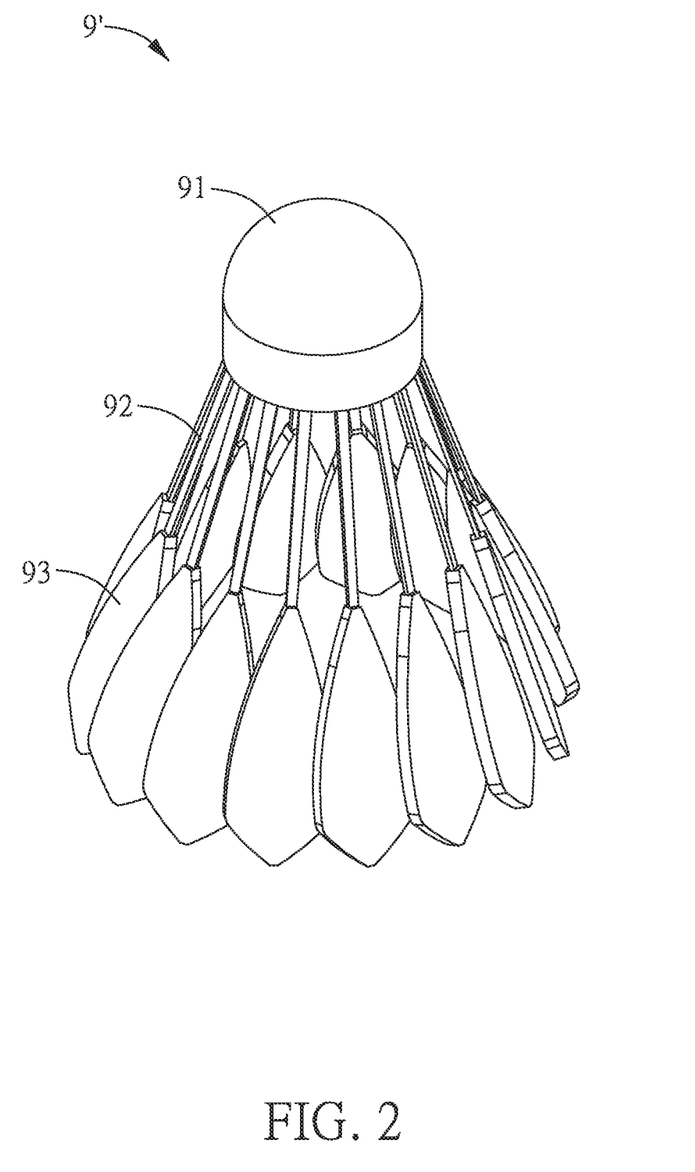
FIG. 2 is a schematic diagram of a semi-finished shuttlecock provided by step S10 in FIG. 1.
Figure 3:
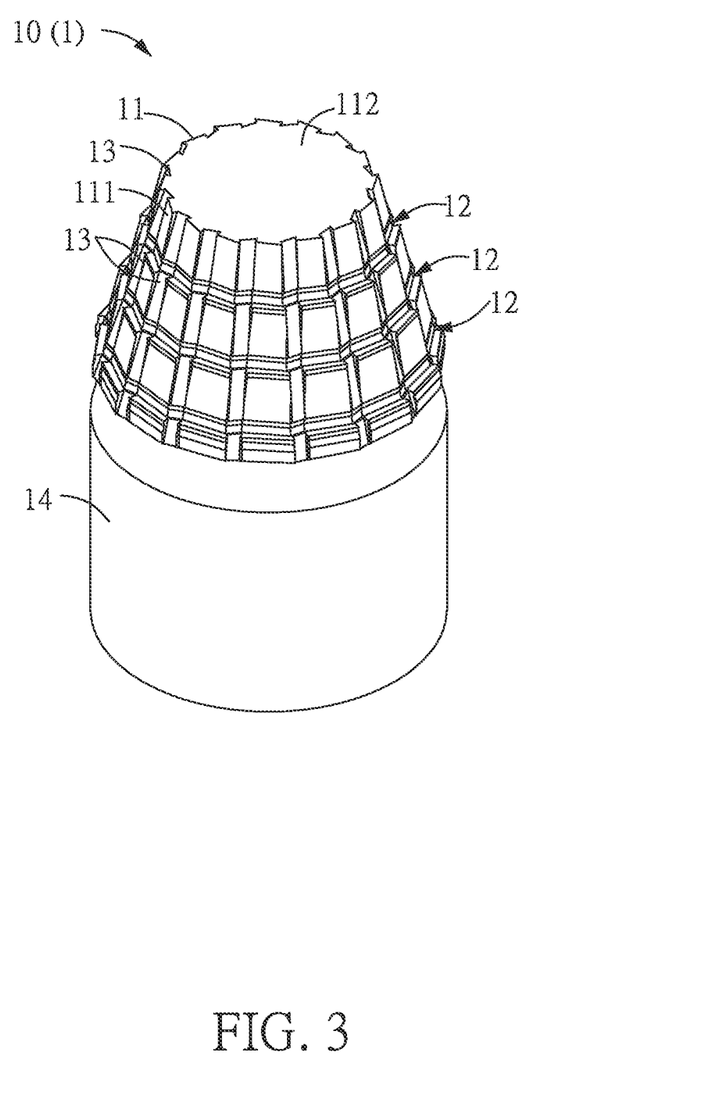
FIG. 3 is a schematic diagram of a male mold according to an embodiment of the present disclosure.
Figure 4:
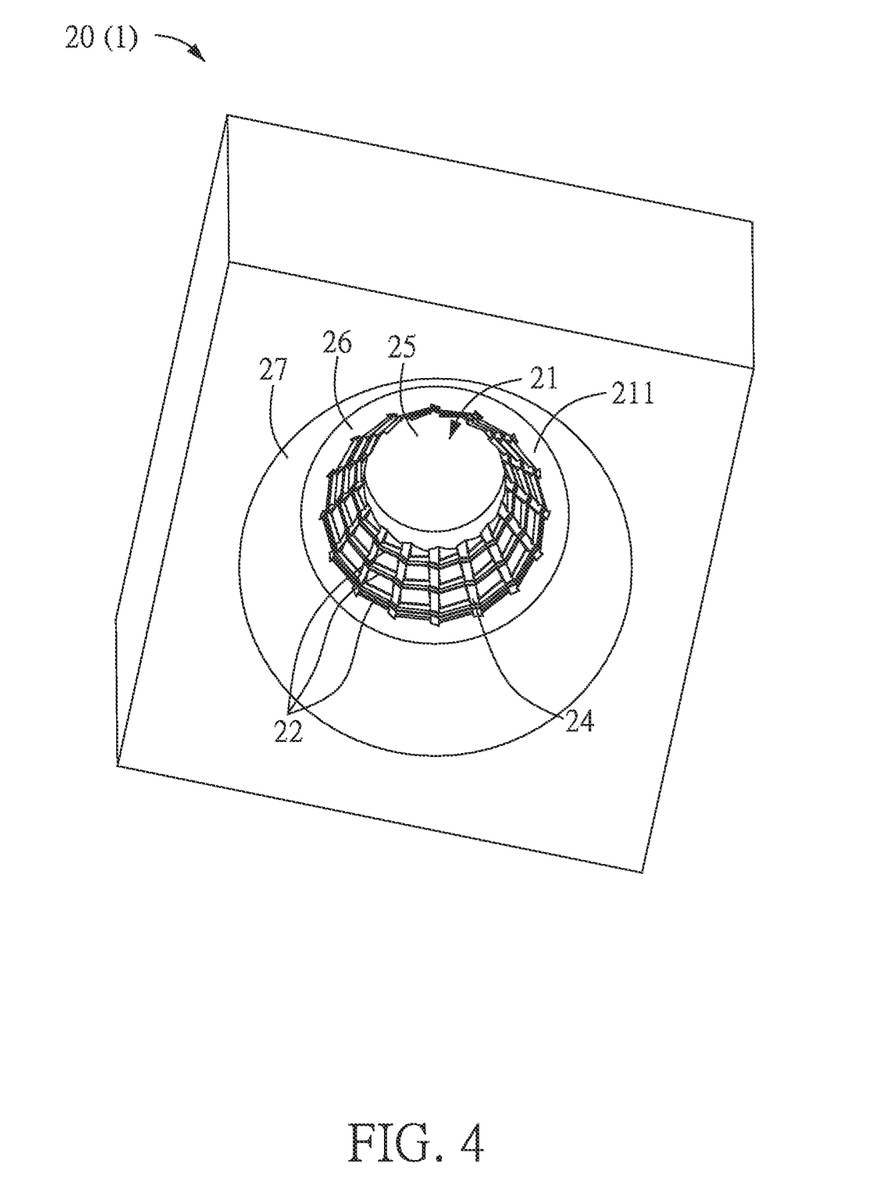

FIG. 1 shows a flowchart of a manufacturing method for an artificial shuttlecock according to an embodiment of the present disclosure. FIG. 2 shows a schematic diagram of a semi-finished shuttlecock provided by step S10 in FIG. 1. FIG. 3 shows a schematic diagram of a male mold according to an embodiment of the present disclosure. FIG. 4 shows a schematic diagram of a female mold according to an embodiment of the present disclosure. Refer to FIG. 1, FIG. 2, FIG. 3 and FIG. 4. An artificial shuttlecock 9 of this embodiment is manufactured by using a mold 1, with a manufacturing method thereof as shown in FIG. 1. The mold 1 of this embodiment is further described according to details of the steps below.

In step S10, a semi-finished shuttlecock 9' is provided.

The manufacturing method for an artificial shuttlecock of this embodiment is primarily a method for manufacturing the artificial shuttlecock 9 (referring to FIG. 1) from the semi-finished shuttlecock 9' (as shown in FIG. 1). The semi-finished shuttlecock 9' includes a ball head 91, a plurality of stems 92 and a plurality of feathers 93. One side of the ball head 91 is a semi-spherical concave surface, and the other side is a flat surface that can be inserted by the stems 92. The plurality of stems 92 are disposed apart at the ball head 91, and one end of each of the stems 92 is inserted at the flat surface of the ball head 91. The other end of each of the stems 92 is connected to the feathers 93, that is, the feathers 93 are respectively connected to the stems 92. In this embodiment, the stems 92 are made a carbon fiber reinforced resin material, so as to reinforce the durability of the stems 92. More specifically, the stems 92 of this embodiment are formed by stacking unidirectional (UD) carbon fiber fabric and woven glass fiber, hence reinforcing the strength and durability of the stems 92.

Preferably, the feathers 93 are connected to the stems 92 by an adhesive and are close to the stems 92. In this embodiment, every two feathers 93 are combined with one stem 92, that is, every two feathers 93 are connected to two opposite sides of the stem 92, respectively. Preferably, the feathers 93 can be adhered to the stems 92, and then the stems 92 are then inserted to the ball head 91.

Furthermore, the feathers 93 of this embodiment may also be artificial feathers in substitution for natural feathers. The feathers 93 are made of a plastic material having a density between 0.9 g/cm$^3$ to 1.48 g/cm$^3$, and the types of the plastic material may be, for example but not limited to, low-density polyethylene (LDPE), linear low-density polyethylene (LLDPE), polyethylene terephthalate (PET), polyethylene (PE), polypropylene (PP), acrylonitrile-butadiene-styrene (ABS), polyimide (PA) and extruded polyethylene (EPE) plastic materials. Preferably, the feathers 93 are made of a combination of LDPE and LLDEP. Moreover, the overall structure of the feather 93 corresponds to the structure of the natural feather of a shuttlecock. Specifically, the feather 93 may be in a mutually symmetrical structure, and the stem 92 is a mutually symmetrical structure about an axis of symmetry, for example, a kite-shaped structure.

In step S20, the semi-finished shuttlecock 9' is placed into a male mold 10.

The mold 1 of this embodiment includes a male mold 10 (as shown in FIG. 3) and a female mold 20 (as shown in FIG. 4). The male mold 10 includes a cone frustum 11 and a plurality of first annular grooves 12. The cone frustum 11 has an outside 111, and the semi-finished. shuttlecock 9' may be placed on the outside 111 of the cone frustum 11.

The first annular grooves 12 are disposed apart on the outside 111 of the cone frustum 11. More specifically, the first annular grooves 12 surround the outside 111 of the cone frustum 11 in a manner of being parallel to one another along the center axis of the cone frustum 11, such that the first annular grooves 12 are also parallel to a top surface 112 of the cone frustum 11.

The first annular grooves 12 are used to form a partial structure of connecting members 94 (referring to FIG. 8) of the artificial shuttlecock 9. Thus, the number of the first annular grooves 12 may be determined with reference to the number of connecting members 94 to be formed. Preferably, the number of the first annular grooves 12 of this embodiment may be three, so as to form three connecting members 93 in the subsequent steps. Preferably, distances between every two adjacent of the first annular grooves 12 are equal, and are preferably between 5 mm and 17.5 mm, which includes 5 mm and 17.5 mm.

Preferably, the male mold 10 further includes a plurality of first stem grooves 13. The first stem grooves 13 are similarly disposed apart on the outside 111 of the cone frustum 11, and intersect the first annular grooves 12. For example, the first annular grooves 12 are horizontally disposed on the outside 111 of the cone frustum 11, and the first stem grooves 13 are vertically disposed on the outside 111 of the cone frustum 11, such that the first stem grooves 13 intersect the first annular grooves 12. Because the first annular grooves 12 surround the outside 111 of the cone frustum 11, each of the first annular grooves 12 connects to all of the first stem grooves 13.

In step S20, the semi-finished shuttlecock 9' is placed on the outside 111 of the cone frustum 11, and at the same time the stems 92 of the semi-finished shuttlecock 9' are respectively accommodated in the first stem grooves 13. In other words, the first stem grooves 13 serve as limiting structures of the stems 92.

Figure 5:
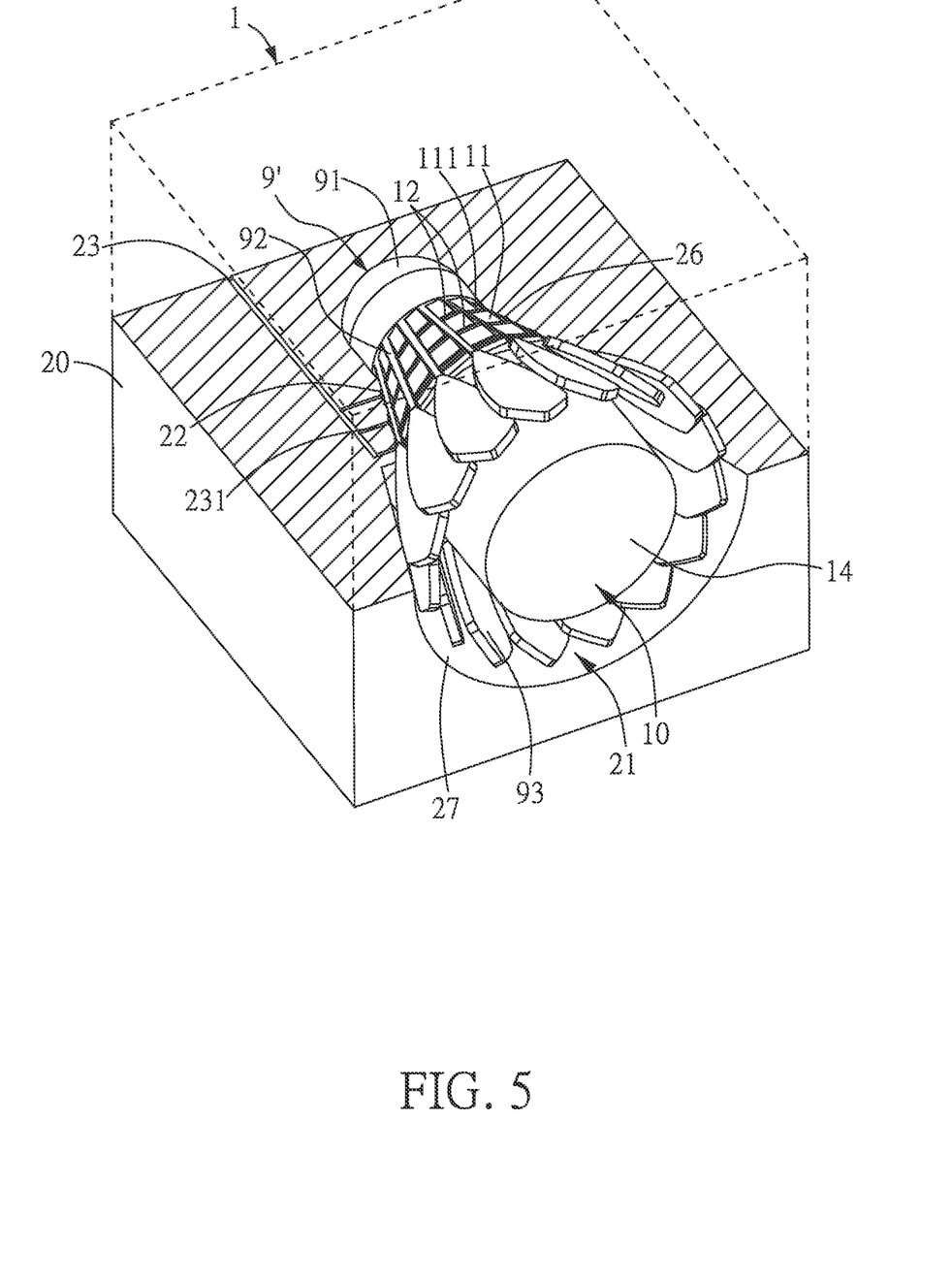
FIG. 5 is a schematic diagram of a semi-finished shuttlecock and a male mold placed into a female mold in step S30 in FIG. 1.

In step S30, the semi-finished shuttlecock 9' and the male mold 10 are placed into the female mold 20.

Figure 6:
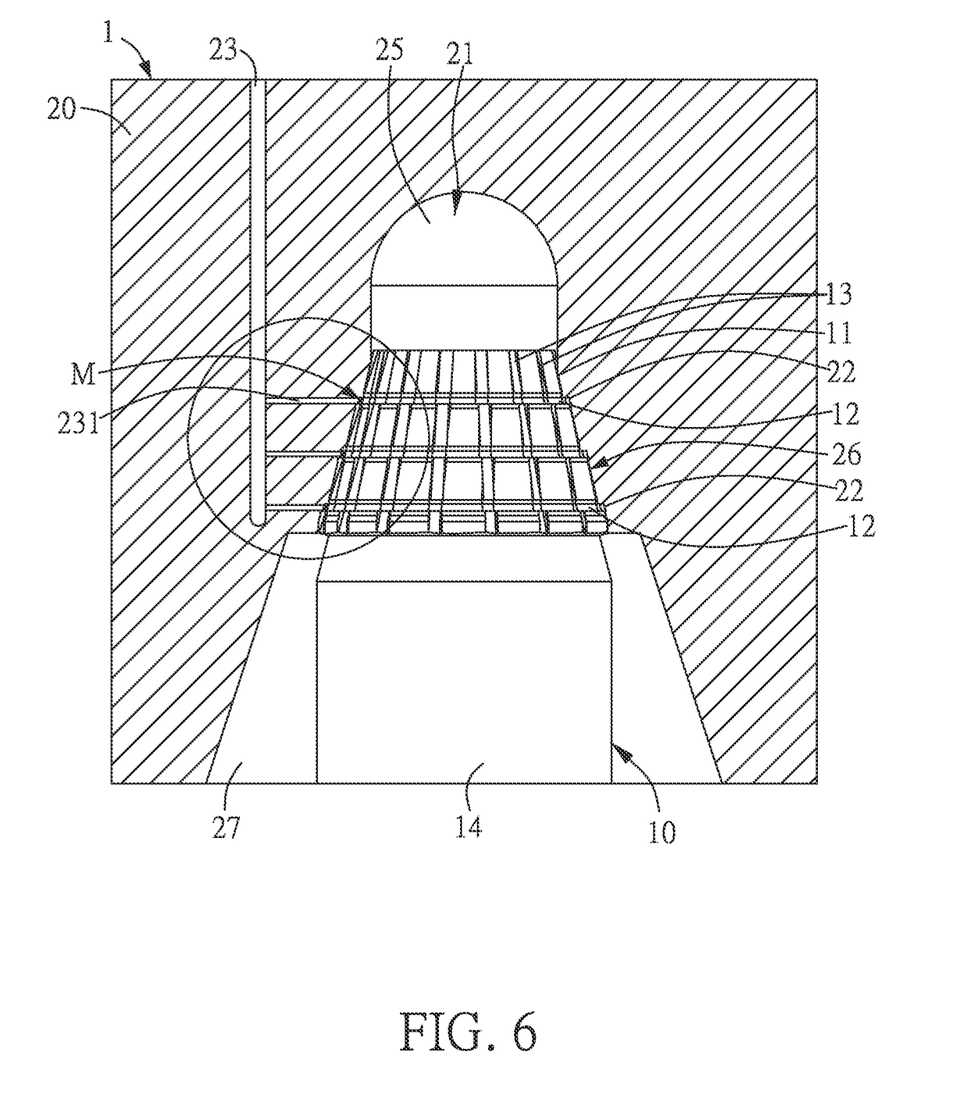
Figure 7:
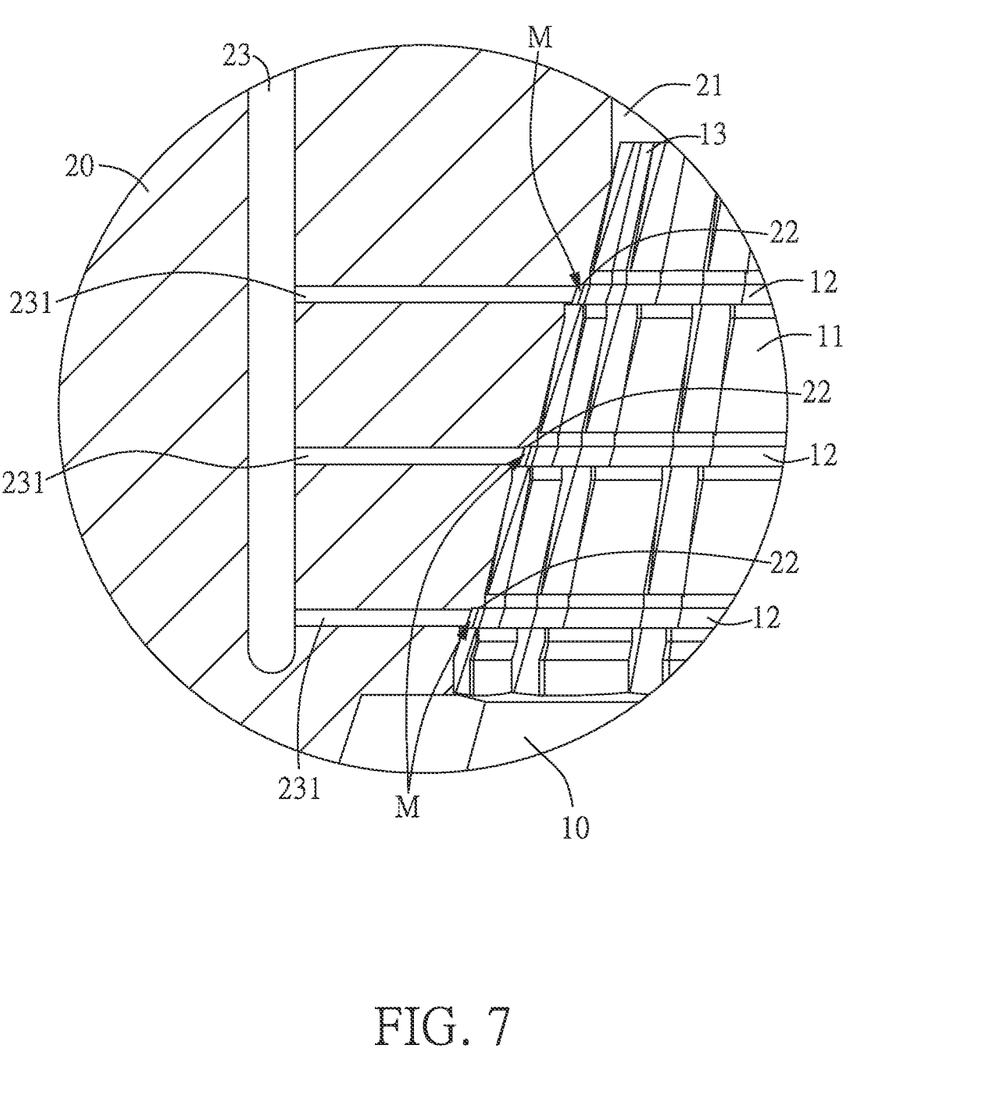
FIG. 7 is an enlarged schematic diagram of a circled portion of the mold in FIG. 6.

FIG. 5 shows a schematic diagram of a semi-finished shuttlecock and a male mold placed into a female mold in step S30 in FIG. 1. FIG. 6 shows a section diagram of a mold according to an embodiment of the present disclosure, FIG. 7 shows an enlarged schematic diagram of a circled portion of the mold in FIG. 6. FIG. 6 is also a section diagram after the male mold in FIG. 3 is combined with the female mold in FIG. 4. Refer to FIG. 4, FIG. 5, FIG. 6 and FIG. 7. In this embodiment, the fen ale mold 20 includes a tapered slot 21, a plurality of second annular grooves 22 and an injection channel 23. The tapered slat 21 has an inner surface 211 (as shown in FIG. 4), and the second annular grooves 22 are disposed apart on the inner surface 211 of the tapered slot 21. The arrangement positions of the second annular grooves 22 need to mutually correspond to the first annular grooves 12, so the second annular grooves 22 surround the inner surface 211 of the tapered slot 21 in a manner of being parallel to one another along the center axis of the tapered slot 21. Moreover, distances between every two adjacent of the second annular grooves 22 are equal to the distances between every two adjacent of the first annular grooves 21.

Because the arrangement positions of the second annular grooves 22 mutually correspond to the first annular grooves 12, each of the first annular grooves 12 can also correspond to each of the second annular grooves 22 when the male mold 10 is placed into the tapered slot 21 of the female mold 20, so as to together form a plurality of molded grooves M, as shown in FIG. 6 and FIG. 7. In other words, the number of the molded grooves M is equal to the number of the first annular grooves 12 (or the second annular grooves 22). In this embodiment, the numbers of the first annular grooves 12 and the second annular grooves 22 are respectively three, so three molded grooves M can be formed. Moreover, the molded grooves M are grooves for subsequently molding the connecting members 94.

The injection channel 23 is for injecting a plastic material of the connecting members 94 to be formed. The injection channel 22 communicates with the second annular grooves 23. In this embodiment, the injection channel 23 has three branch channels 231, which respectively communicate with the second annular grooves 22. In other words, the number of the branch channels 231 is the same as the number of the second annular grooves 22 (also the same as the numbers of the first annular grooves 12 and the molded grooves M).

In step S40, a plastic material is injected from the injection channel 23, and the plastic material is solidified in the molded grooves M to form the plurality of connecting members 94.

As described previously, the injection channel 23 communicates with the second annular grooves 22, and the first annular grooves 12 and the second annular grooves 22 together form the molded grooves M; that is, the molded grooves M can communicate with the injection channel 23 through the second annular grooves 22. Thus, the plastic material can be injected into the injection channel 23, flow into the molded grooves M through the branch channels 231, and then solidify in the molded grooves M to form the connecting members 94. The plastic material may be, for example but not limited to, a plastic material such as Polypropylene (PP) or Polyamide (PA), so as to form the connecting members 94 made of PP or PA.

Because the first annular grooves 12 are disposed to intersect the first stem grooves 13 (for accommodating the stems 92), the first annular grooves 12 communicate with the first stem grooves 92 at the intersections. Thus, the plastic material can further flow to the intersections once being injected into the molded grooves M, and solidify on outsides of parts (intersections) of the stems 92, further connecting the solidified and formed connecting members 94 with the stems 92.

Preferably, the female mold 20 may also include a plurality of second stem grooves 24, which are disposed apart on the inner surface 211 of the tapered slot 21 and intersect the second annular grooves 22, as shown in FIG. 4. The stems 92 of the semi-finished product 9' may be accommodated. in spaces formed by the first stem grooves 13 and the second stem grooves 24, allowing the solidified and formed connecting members 94 to evenly envelop the outsides of the stems 92

Preferably, the tapered slot 21 further includes a ball head portion 25, a first cone portion 26 and the second cone portion 27. The first cone portion 26 is disposed adjacent to the ball head portion 25, and the second cone portion 27 is disposed adjacent to the first cone portion 26. That is, the first cone portion 26 is located between the ball head portion 25 and the second cone portion 27. Referring to FIG. 4, FIG. 5 and FIG. 6, the ball head 91 of the semi-finished shuttlecock 9' is accommodated in the ball head portion 25, and the second annular grooves 22 and the second stem grooves 24 are both disposed at the first cone portion 26.

As shown in FIG. 6, an inner diameter of the second cone portion 27 is greater than an inner diameter of the first cone portion 26. That is, the second cone portion 27 expands toward an outside of the tapered slot 21, such that the feathers 93 of the semi-finished shuttlecock 9' can be accommodated in the second cone portion 27. Preferably, the male mold 10 further includes a cylindrical portion 14, which is disposed adjacent to the cone frustum 11 and may correspond to the second cone portion 27 of the female mold 20. The feathers 93 may be accommodated between the cylindrical portion 14 and the second cone portion 27.

Figure 8:
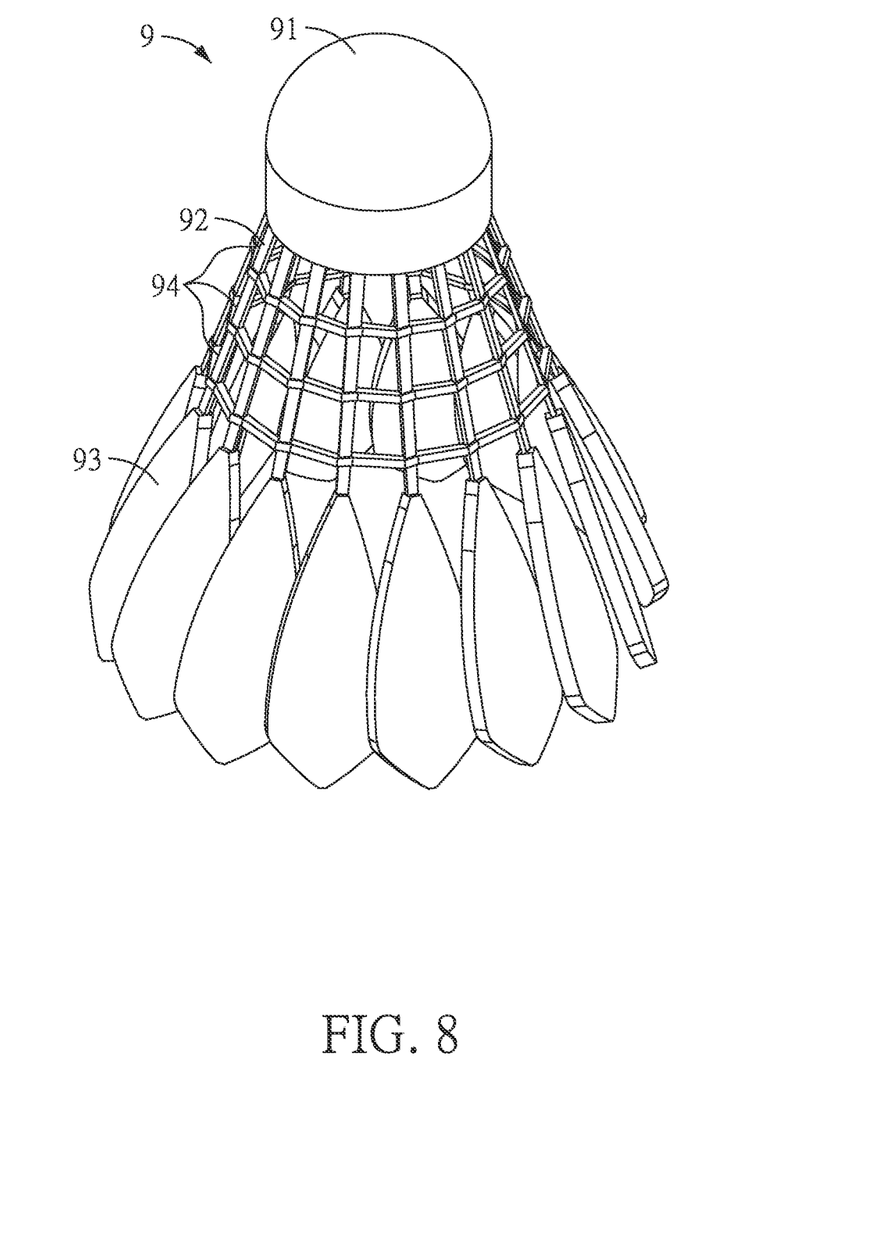
FIG. 8 is a schematic diagram of an artificial shuttlecock made using the mold in FIG. 3.

In step S50, the artificial shuttlecock 9 is removed from the mold 1.

FIG. 8 shows a schematic diagram of an artificial shuttlecock made using the mold in FIG. 3. Refer to FIG. 8. The artificial shuttlecock 9 is manufactured after the connecting members 94 are formed from the solidified plastic material in the molded grooves M (step S40). Lastly, the artificial shuttlecock 9 is removed from the mold I, as shown in FIG. 8.

By forming the connecting members 94 by means of solidifying and molding a plastic material, steps including winding, tying, knotting and gluing of wheel lines for connecting members using a linen yarn can be eliminated, further enhancing manufacturing efficiency of the artificial shuttlecock 9.

Moreover, the last step of the manufacturing method for the artificial shuttlecock 9 is applying an adhesive to the entire of the artificial shuttlecock 9, and thus time is needed to wait for the adhesive to dry. In this embodiment, because the stems 92 are made of a carbon fiber reinforced resin material and the connecting members 94 are made of a solidified plastic material, an adhesive may be applied to the entire artificial shuttlecock 9 by using a light curing adhesive (for example, UV adhesive), similarly enhancing the manufacturing efficiency of the artificial shuttlecock 9.

In continuation of the description above, in the manufacturing method and the mold for an artificial shuttlecock according to the present disclosure, the mold includes a male mold and a female mold. The male mold includes a cone frustum and a plurality of first annular grooves, and the first annular grooves are disposed apart on an outside of the cone frustum. Correspondingly, the male mold includes a tapered slot and a plurality of second annular grooves, and the second annular grooves are disposed apart at the tapered slot. When the semi-finished shuttlecock and the male mold are placed into the female mold, the first annular grooves correspond to the second annular grooves to form molded grooves. Moreover, the female mold further includes an injection channel communicating with the second annular grooves. Once a plastic material is injected from the injection channel, the plastic material is solidified in the molded grooves to form a plurality of connecting members, thereby forming the artificial shuttlecock. By forming the connecting members by means of solidifying a plastic material, steps including winding, tying, knotting and gluing of wheel lines for connecting members using a linen yarn can be eliminated, further enhancing manufacturing efficiency of artificial shuttlecocks.

It should be noted that many of the above-mentioned embodiments are given as examples for description, and the scope of the present invention should be limited to the scope of the following claims and not limited by the above embodiments.

What is claimed is:

1. A manufacturing method for an artificial shuttlecock, comprising:
    providing a semi-finished shuttlecock, the semi-finished shuttlecock comprising a ball head, a plurality of stems and a plurality of feathers, one end of each of the stems inserted at the ball head, the feathers connected to one other end of each of the stems;
    placing the semi-finished shuttlecock in a male mold, the male mold comprising a cone frustum and a plurality of first annular grooves, the first annular grooves disposed apart on an outside of the cone frustum, the semi-finished shuttlecock disposed on the outside of the cone frustum;
    placing the semi-finished shuttlecock and the male mold into a female mold, the female mold comprising a tapered slot, a plurality of second annular grooves and an injection channel, the second annular grooves disposed apart on an inner surface of the tapered slot, the injection channel communicating with the second annular grooves, each of the first annular grooves corresponding to each of the second annular grooves to form a plurality of molded grooves, the molded grooves communicating with the injection channel through the second annular grooves; and
    injecting a plastic material from the injection channel, the plastic material solidifying in the molded grooves to form a plurality of connecting, members.

2. The manufacturing method for an artificial shuttlecock according to claim 1, wherein the first annular grooves are parallel to a top surface of the cone frustum.

3. The manufacturing method for an artificial shuttlecock according to claim 1, wherein the male mold comprises a plurality of first stem grooves disposed apart on the outside of the cone frustum and intersecting the first annular grooves, and the stems of the semi-finished shuttlecock are accommodated in the first stem grooves.

4. The manufacturing method for an artificial shuttlecock according to claim 1, wherein numbers of the first annular grooves and the second annular grooves are respectively three so as to form three of the molded grooves.

5. The manufacturing method for an artificial shuttlecock according to claim 4, wherein distances between every two adjacent of the first annular grooves are substantially equal.

6. The manufacturing method for an artificial shuttlecock according to claim 1, wherein the tapered slot comprises a ball head portion and a first cone portion, the first cone portion is disposed adjacent to the ball head portion, the ball head of the semi- finished shuttlecock is accommodated in the ball head portion, and the second annular grooves are disposed at the first cone portion.

7. The manufacturing method fix an artificial shuttlecock according to claim 6, wherein the tapered slot comprises a second cone portion disposed adjacent to the first cone portion, an inner diameter of the second cone portion is greater than an inner diameter of the first cone portion, and the feathers of the semi-finished shuttlecock are accommodated in the second cone portion.

8. A mold, for manufacturing an artificial shuttlecock from a semi-finished shuttlecock, the semi-finished shuttlecock comprising a ball head, a plurality of stems and a plurality of feathers, one end of each of the stems inserted at the ball head, the feathers connected to one other end of each of the stems; the mold comprising:
    a male mold, comprising:
        a cone frustum, having an outside, the semi-finished shuttlecock placed on the outside of the cone frustum; and
        a plurality of first annular grooves, disposed apart on the outside of the cone frustum; and
    a female mold, comprising:
        a tapered slot, having an inner surface;
        a plurality of second annular grooves, disposed apart on the inner surface of the tapered slot, each of the first annular grooves corresponding to each of the second annular grooves to form a plurality of molded grooves when the semi-finished shuttlecock and the male mold are placed into the female mold; and
        an injection channel, communicating with the second annular grooves, the molded grooves communicating with the injection channel through the second annular grooves,
    wherein, a plastic material is injected from the injection channel, and the plastic material solidifies in the molded grooves to form a plurality of connecting members.

9. The mold according to claim 8, wherein the first annular grooves are parallel to a top surface of the cone frustum.

10. The mold according to claim 8, wherein the male mold comprises a plurality of first stem grooves disposed apart on the outside of the cone frustum and intersecting the first annular grooves, and the stems of the semi-finished shuttlecock are accommodated in the first stem grooves.

11. The mold according to claim 8, wherein numbers of the first annular grooves and the second annular grooves are respectively three so as to form three of the molded grooves.

12. The mold according to claim 11, wherein distances between every two adjacent of the first annular grooves are substantially equal.

13. The mold according to claim 8, wherein the tapered slot comprises a ball head portion and a first cone portion, the first cone portion is disposed adjacent to the ball head portion, the ball head of the semi-finished shuttlecock is accommodated in the ball head portion, and the second annular grooves are disposed at the first cone portion.

14. The mold according to claim 13, wherein the tapered slot comprises a second cone portion disposed adjacent to the first cone portion, an inner diameter of the second cone portion is greater than an inner diameter of the first cone portion, and the feathers of the semi-finished shuttlecock are accommodated in the second cone portion.

\* \* \* \* \*